April 15, 1969 T. H. CHAPMAN 3,439,172

AUTOMATIC GAIN SYSTEM FOR A PHOTOMULTIPLIER TUBE

Filed Jan. 30, 1967 Sheet 1 of 3

Inventor
Thomas Henry Chapman
By Cushman, Darby & Cushman
Attorneys

Thomas Henry Chapman
Inventor
By Cushman, Darby & Cushman
Attorneys

April 15, 1969 T. H. CHAPMAN 3,439,172

AUTOMATIC GAIN SYSTEM FOR A PHOTOMULTIPLIER TUBE

Filed Jan. 30, 1967 Sheet 3 of 3

Thomas Henry Chapman
Inventor

By Cushman, Darby & Cushman
Attorneys

United States Patent Office 3,439,172
Patented Apr. 15, 1969

3,439,172
AUTOMATIC GAIN SYSTEM FOR A PHOTOMULTIPLIER TUBE
Thomas Henry Chapman, Sanderstead, Surrey, England, assignor to Gunson's Sortex Limited, London, England, a corporation of Great Britain
Filed Jan. 30, 1967, Ser. No. 612,528
Claims priority, application Great Britain, Feb. 8, 1966, 5,525/66
Int. Cl. H01j *39/12;* H03k *1/12*
U.S. Cl. 250—207 12 Claims

ABSTRACT OF THE DISCLOSURE

A system for controlling automatically the gain of a circuit which receives a pulsed waveform, the pulses of which may vary in amplitude and may have signals superimposed thereon due, for example, to light reflected from objects to be scanned. A capacitor is charged with said pulses and superimposed signals and a switch is actuated automatically during each excursion of said pulsed waveform in a predetermined direction to discharge said capacitor at least partially prior to the arrival of the next superimposed signal. The voltage across said capacitor is compared with a reference voltage to produce a gain control voltage which is used to control the gain of the circuit so that on receipt of each pulse the circuit gain is increased to and maintained at a substantially constant high value during the presence of a signal and is amplitude variations of the pulses on which the signals are superimposed are substantially eliminated.

This invention relates to an automatic gain control system.

According to the present invention in a broad aspect thereof there is provided a system for controlling automatically the gain of a circuit adapted to receive a pulsed waveform the pulses of which may vary in amplitude and may have signals superimposed thereon, said system comprising means for charging a capacitor with said pulses and superimposed signals, switch means actuated automatically during each excursion of said pulsed waveform in a predetermined direction to discharge at least partially said capacitor prior to the expected arrival of the next superimposed signal, means for comparing the voltage across said capacitor with a reference voltage to produce a gain control voltage dependent on the resultant of comparison, and means utilising said gain control voltage to control the gain of the circuit, whereby on receipt of each pulse by said circuit the gain is increased to and maintained at a high value which is substantially constant during the presence of a said signal and is whereby amplitude variations of the pulsed waveform on which said signals are superimposed are substantially eliminated.

Preferably said pulses are substantially rectangular and said signals are of opposite polarity to the respective pulses on which they are superimposed.

Said switch means preferably comprises a trigger circuit connected and arranged to be triggered at a predetermined level in each said excursion of said pulsed waveform in said predetermined direction, intermediate the maximum level of said pulses and the expected level of the superimposed signals. Said trigger circuit may comprise, for example, a Schmitt trigger.

The switch means, when actuated, may complete a shunt circuit across the said capacitor. Said shunt circuit may include a transistor which is rendered conducting by a voltage from the switch means when the latter is actuated.

The reference voltage may be provided by a Zener diode.

The means utilising the gain control voltage preferably includes an oscilaltor, the rectified output amplitude of which is dependent on said gain control voltage and is applied to one or more dynodes of an electron multiplier tube.

The invention is particularly, but not exclusively, applicable to circuit arrangements for use with photoelectric viewing or scanning heads used for example in automatic sorting equipment for storing objects in accordance with their light reflecting properties or in automatic monitoring and control equipment for monitoring objects to assess their colour or other light reflecting properties and controlling in dependence thereon a stage in the production of said objects. Thus the said electron multiplier tube may form part of a photomultiplier having a cathode to which light varying in intensity in correspondence with said pulsed waveform and superimposed signals is applied, the circuit for charging the capacitor being adapted to receive the electrical output signal of said photomultiplier. In order that the said output signal may have the preferred pulsed form with superimposed signals of opposite polarity to the respective pulses, it may be arranged that the light entering the photomultiplier is reflected from the objects to be sorted or monitored and from a light reflecting background of higher reflectivity than the objects, the said light being periodically interrupted so that the electrical output of the photomultiplier comprises a pulsed waveform.

The invention will be described, merely by way of example, with reference to the accompanying drawings, in which.

Figure 1:
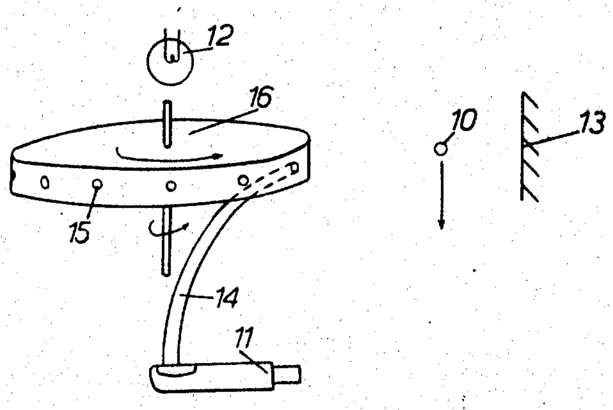
FIGURE 1 is a simplified diagrammatic arrangement of part of a sorting machine to which the present invention may be applied.

Referring to FIGURE 1, the rudimentary parts of the "sorting head" of an automatic photoelectric sorting machine are shown diagrammatically. Objects 10 to be sorted, which may be, for example, rock samples, or smaller objects such as seeds, are allowed to fall through a path in which the object 10 reflects part of a light beam into a photomultiplier 11. The light originates from a source 12, for example, a quartz iodine lamp energised from a 50 cycle/sec. A.C. mains supply, a further part of the light beam being reflected from a reflecting background 13. The light entering the photomultiplier 11 will therefore comprise substantially white light reflected from the reflecting background 13 with, superimposed thereon, light reflected from the surface of the object 10.

The reflected light is transmitted to the photomultiplier 11 through a light conductor 14 comprising, for example, a bundle of optical fibres. The light enters the light conductor 14 through a respective aperture 15 in a rotating disc 16 which is driven (by means not shown) at a high rotational speed of, for example 3000 r.p.m. Pulses of light therefore enter the conductor 14 from the sorting path whenever an aperture 15 of the rotating disc 16 is aligned therewith.

Although only one sorting path has been shown in FIGURE 1, it will be clear that more than one such path may be arranged angularly about the disc 16 so that the photomultiplier 11 may serve to "view" each path in turn.

The resultant electrical signal from the photomultiplier 11 will comprise a pulsed waveform, the pulses of which correspond to the pulses of light entering the photomultiplier 11 as each aperture 15 is aligned in turn with the light conductor 14 on rotation of the disc 16. In the absence of any objects 10 in the sorting path, the resulting output of the photomultiplier 11 will comprise a waveform similar to that shown in FIGURE 2, in which the uppermost (uniform) level, at zero potential, corresponds to zero light intensity, that is, where the light conductor 14 is blocked by the disc 16, and the negative-going peaks at substantially −6 volts, represent the intensity of light reflected from the background 13 and any objects 10 as "viewed" by the photomultiplier 11 through each aperture 15 in turn. In the example illustrated, there are sixteen apertures 15 in the periphery of the disc 16, the portion of the pulsed waveform illustrated corresponding to one complete revolution of the disc 16.

Figure 2:
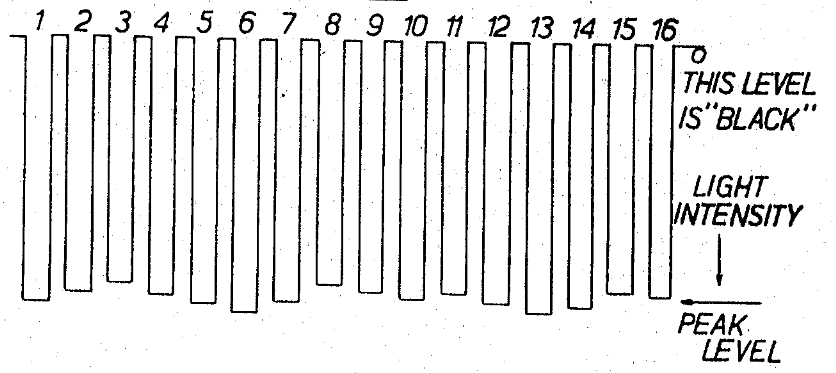
FIGURE 2 is a diagrammatic representation of the scanning waveform of the photomultiplier in the machine of FIGURE 1.

It will be seen that the pulses in the photomultiplier output waveform of FIGURE 2 do not have a uniform amplitude. There are three error sources responsible for this variation in amplitude: (a) sporadic variations in the intensity of the source 12 due to variations in the mains supply voltage; (b) cyclical variations in the intensity of the lamp 12 due to the mains alternating current ripple; when used with a 50 cycle/sec. mains supply, a quartz iodine lamp gives a light output which fluctuates at 100 cycles/sec. by approximately ±3%, measured as a percentage of the total output light intensity; and (c) variations due to differences in the diameter of successive holes 15 in the disc 16. A manufacturing error of ±2% in the diameter of the holes 15 will give a variation in hole area of ±4%, leading to a variation in light intensity and photomultiplier output level of ±4%.

The sorting machine (not shown) operates to sort the objects 10 in accordance with their light reflectivities, that is, in dependence on signals superimposed on the pulsed waveform. These signals are generally quite small, and while, therefore, any one of the errors referred to above might be tolerated alone, their combined presence is unacceptable and it is an object of the present invention to stabilise the peak level of the output pulses of the photomultiplier 11.

Figure 3:
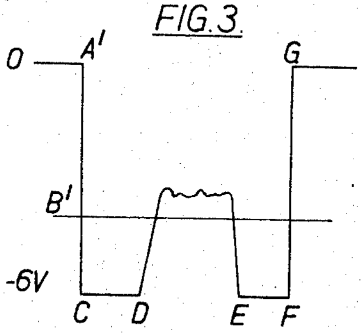
FIGURE 3 is an enlarged view of part of the scanning waveform showing a signal superimposed on a pulse thereof, and FIGURES 4*a* and 4*b* together constitute a circuit diagram of one form of system according to the invention, FIGURE 4*b* being a continuation of FIGURE 4*a* from the points KLMN on the right thereof.

Referring to FIGURE 3, a single scanning pulse of the pulsed waveform of FIGURE 2 is shown on an enlarged horizontal scale, the pulse ACFG comprising a negative-going excursion AC at its leading edge to a level C, at substantially −6 volts, representing the light intensity corresponding to the white background 13. It is arranged that the background 13 has a reflectivity which is higher than the reflectivity of any object 10 to be examined. When, therefore, an object 10 is interposed between the background 13 and the respective hole 15 through which the background is being viewed at that instant, the resultant output of the photomultiplier 11 will have a positive-going signal DE superimposed on the negative "background" pulse ACFG, as shown.

The objects 10 are sorted automatically in dependence on the intensity level of the light reflected therefrom, and it is therefore necessary for the sorting machine to assess the level of the signal DE due to each object 10 scanned. To do this accurately, the "background" pulse ACFG representing the background has to have a substantially constant peak reference level CF, despite the sources of error (a)–(c) referred to above. This is effected, according to the present invention, by arranging for the output signals of the photomultiplier 11 to charge a capacitor rapidly to the peak value of successive pulses, the capacitor discharging slowly between successive pulses to keep the voltage across the capacitor substantially constant. At a level B intermediate the peak reference level C and the expected level of the superimposed signals, switch means operate automatically to connect momentarily a shunt across the capacitor and discharge, at least partially, the capacitor through a resistance. This brings about a momentary fall in the voltage across the capacitor.

The capacitor is connected in a gain control circuit in which the voltage across the capacitor is compared with a standard reference voltage to give as the resultant of comparison a gain control voltage which controls the gain of the circuit handling the signals. Accordingly, when the voltage across the capacitor momentarily decreases due to the operation of the switch means referred to above, the gain will, momentarily, be increased by the gain control voltage, as hereinafter described, so that the incoming pulses rise rapidly to the peak reference level C, being thereafter stabilised at said level by the gain control voltage.

Figure 4A:
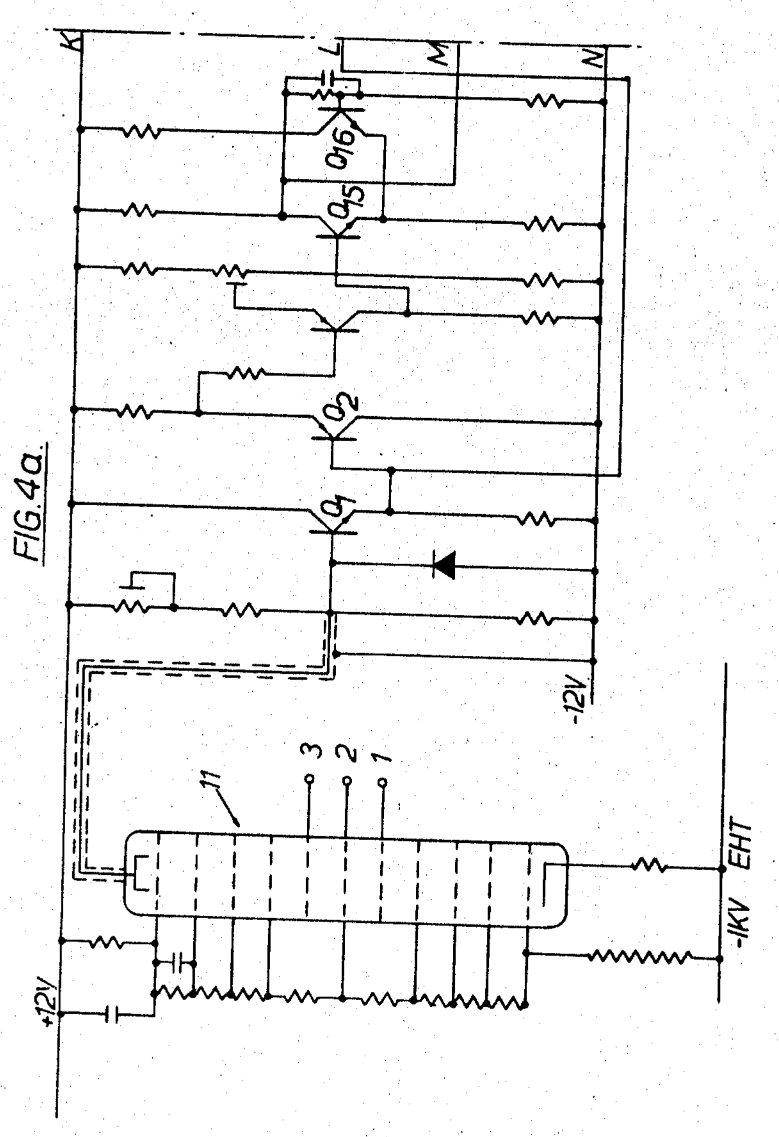
Figure 4B:
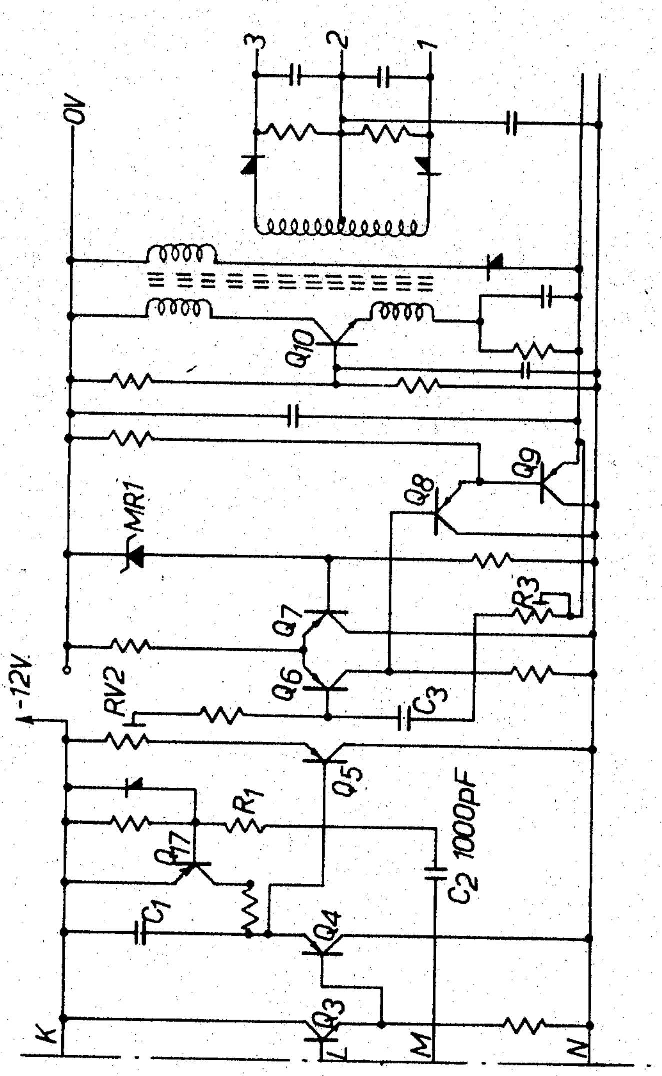

One circuit in accordance with the invention is shown in FIGURES 4*a* and 4*b*. Control of the circuit gain is achieved by controlling the voltages on dynodes numbered 1 and 3 of the photomultiplier 11, the photomultiplier 11 having eleven dynodes in all. Transistors Q1, Q3, Q4 are complementarily arranged emitter followers which provide a low impedance signal path from the anode of the photomultiplier 11 to a capacitor $C_1$, so that the capacitor $C_1$ is charged rapidly by the negative excursions of the photomultiplier output waveform (FIGURE 2). A further emitter follower Q5 is connected across the capacitor $C_1$ to provide a voltage dependent on the instantaneous voltage across the capacitor $C_1$ at low impedance across a potentiometer RV2.

The potential at the wiper arm of potentiometer RV2 is compared with a reference voltage from a Zener diode MR1 in a voltage comparison circuit comprising a long-tailed pair circuit including transistors Q6, Q7. The output of the long-tailed pair circuit constitutes the gain control voltage. When the voltage at the wiper arm of potentiometer RV2 falls, due to an increase in the voltage across the capacitor $C_1$, gain control voltage from the long-tailed pair circuit Q6, Q7 acts, through emitter followers Q8, Q9, to decrease the oscillation amplitude of a transistor oscillator Q10. The rectified output of the oscillator Q10 is fed to the respective dynodes 1 and 3 of the photomultiplier 11 to control the overall gain thereof, so that when the oscillation amplitude of oscillator Q10 is decreased, the potentials at dynodes 1 and 3 are reduced to reduce the gain of the photomultiplier 11.

Switch means in the form of a Schmitt trigger circuit having as active elements thereof transistors Q15, Q16 are arranged to be triggered to render transistor Q15 conducting when the negative-going excursion AC of the pulsed waveform reaches the predetermined level B referred to above (FIGURE 3). The negative-going edge of the waveform at the collector of Q15 is differentiated by a capacitance $C_2$ and resistance $R_1$, the resultant voltage pulse being supplied to the base of a transistor Q17 which is connected across the capacitor $C_1$. Q17 is normally non-conducting, but on receipt of the pulse from the Schmitt trigger circuit, Q17 momentarily conducts, to discharge partially the capacitor $C_1$. This has the effect of momentarily causing the gain control circuit to increase the overall gain, as explained above, as the potential increases further at the wiper arm of potentiometer RV2, thereby ensuring that the said negative excursion in each case reaches the desired peak level C (FIGURE 3).

Capacitor $C_3$ and variable resistance $R_3$ are connected between the emitter of transistor Q9 and the base of Q6 to provide regenerative feedback and ensure stability of the gain controlling circuit.

By virtue of the partial discharge of capacitor $C_1$ at the predetermined level B (FIGURE 3), it is arranged that the circuit gain rises rapidly to provide rapid response over the period AC, but is thereafter stabilised by the gain control circuit for the remainder of the pulse CF and, therefore, during the occurrence of the superimposed signal DE.

It will be appreciated that the circuit described above provides compensation for variations in the sizes of the holes 15 in the disc 16. Some degree of compensation is also achieved for variations in the intensity of the light source 12, by virtue of the fact that the scanning rate of the sorting channel by the holes 15 is higher than the rate of fluctuation of the light intensity, which is of the order of the mains frequency. Thus for a 100 cycle/sec. fluctuation of light intensity (due to 50 cycle/sec. mains) and a scanning rate of 800 scans per second, (that is, a disc with 16 holes rotating at 3000 r.p.m.) then the circuit as described above acts to stabilise the output pulse level 8 times in each cycle of light intensity fluctuation. In this way, light intensity variation which would otherwise lead to an error in the output of the photomultiplier of, say, ±3% leads to a resultant final variation in the output of approximately ±1%. The degree of compensation for light intensity fluctuations in this way is clearly dependent on the scanning rate, so that if the scanning rate were doubled, the resultant error due to light intensity fluctuations would be halved.

I claim:

1. In a circuit which is adapted to receive a pulsed waveform the pulses of which may vary in amplitude and may have signals superimposed thereon, an automatic gain control system including a capacitor, means for charging the capacitor with pulses and superimposed signals of the said pulsed waveform, switch means actuated automatically during each excursion of said pulsed waveform in a predetermined direction to discharge at least partially said capacitor prior to the expected arrival of the next superimposed signal, means providing a reference voltage, comparator means for comparing the voltage across said capacitor with said reference voltage to produce a gain control voltage dependent on the resultant of comparison, and means utilizing said gain control voltage to control the gain of the circuit, whereby on receipt of each pulse by said circuit the gain is increased to and maintained at a high value which is substantially constant during the presence of said signal and whereby amplitude variations of the pulsed waveform on which said signals are superimposed are substantially eliminated.

2. A system as claimed in claim 1 wherein said pulses are substantially rectangular and said signals are of opposite polarity to the respective pulses on which they are superimposed.

3. A system as claimed in claim 2 wherein said switch means comprises a trigger circuit connected and arranged to be triggered at a predetermined level in each said excursion of said pulsed waveform in said predetermined direction, said predetermined level being intermediate the maximum level of said pulses and the expected level of the superimposed signals.

4. A system as claimed in claim 3 in which said trigger circuit comprises a Schmitt trigger circuit.

5. A system as claimed in claim 1 including a shunt circuit across said capacitor, said shunt circuit being completed by the switch means when the latter is actuated.

6. A system as claimed in claim 5 wherein said shunt circuit includes a transistor which is rendered conducting by a voltage from the switch means when the latter is actuated.

7. A system as claimed in claim 1 wherein the means providing a reference voltage comprises a Zener diode.

8. A system as claimed in claim 1 wherein the means utilising the gain control voltage includes an oscillator, the rectified output amplitude of which is dependent on said gain control voltage and is applied to one or more dynodes of an electron multiplier tube.

9. A system as claimed in claim 8 including a photomultiplier, the electron multiplier tube forming part of said photomultiplier and the latter having a cathode to which light varying in intensity in correspondence with said pulsed waveform and superimposed signals is applied, the circuit for charging the capacitor being adapted to receive the electrical output signal of said photomultiplier. 10. A system as claimed in claim 1 wherein said circuit for charging the capacitor comprises one or more emitter followers.

11. A system according to claim 9 wherein the photomultiplier is arranged to receive light reflected from objects to be sorted or monitored in accordance with their light reflecting properties.

12. A system as claimed in claim 11 including a light reflecting background of high reflectivity than the objects, the light entering the photomultiplier comprising light reflected from the objects to be sorted and from said background, means being provided for interrupting said light periodically so that tthe electrical output of the photomultiplier comprises a pulsed waveform.

References Cited

UNITED STATES PATENTS

| | | | |
|---|---|---|---|
| 2,911,535 | 11/1959 | Muench | 250—207 X |
| 3,354,773 | 11/1967 | Shreve | 250—207 X |

JAMES W. LAWRENCE, *Primary Examiner.*

C. R. CAMPBELL, *Assistant Examiner.*

U.S. Cl. X.R.

307—297